INVENTOR.
WILLIAM C. SUSOR
BY
Thomas H. Grafton
ATTORNEY

INVENTOR.
WILLIAM C. SUSOR
BY
Thomas H. Grafton
ATTORNEY

INVENTOR.
WILLIAM C. SUSOR
BY
Thomas H. Grafton
ATTORNEY

INVENTOR.
WILLIAM C. SUSOR
BY
Thomas H. Grafton
ATTORNEY

April 18, 1967 W. C. SUSOR 3,315,068
STERLING MULTIPLIER
Filed May 17, 1965 6 Sheets-Sheet 5

INVENTOR.
WILLIAM C. SUSOR
BY
Thomas H. Grafton
ATTORNEY

INVENTOR.
WILLIAM C. SUSOR
BY
Thomas H. Grafton
ATTORNEY 3,315,068
STERLING MULTIPLIER
William C. Susor, Oregon, Ohio, assignor to Toledo Scale Corporation, Toledo, Ohio, a corporation of Ohio
Filed May 17, 1965, Ser. No. 456,456
5 Claims. (Cl. 235—151.33)

This invention relates to computing apparatus for multiplying in the sterling money system.

The computing apparatus is basically the same as the computing apparatus disclosed and claimed in U.S. application Ser. No. 439,751 filed Mar. 15, 1965, in the name of William C. Susor, the prior apparatus being converted from multiplying in the decimal money system to multiplying in the sterling money system, and is particularly suitable for use in the system for weighing, computing and printing a record of the weight and value of each of a plurality of successively weighed loads which is disclosed in U.S. application Ser. No. 429,230 filed Feb. 1, 1965, in the names of William C. Susor and Orval J. Martin.

The objects of this invention are to provide new techniques for multiplying in the sterling money system, to provide new computing apparatus for multiplying sterling money figures, to simplify such apparatus, to increase the reliability of such apparatus, and to provide improved sterling computing apparatus for condition measuring and indication systems.

The above and other objects and features of this invention will be appreciated more fully from the following detailed description when read with reference to the accompanying drawings wherein.

Figure 1:
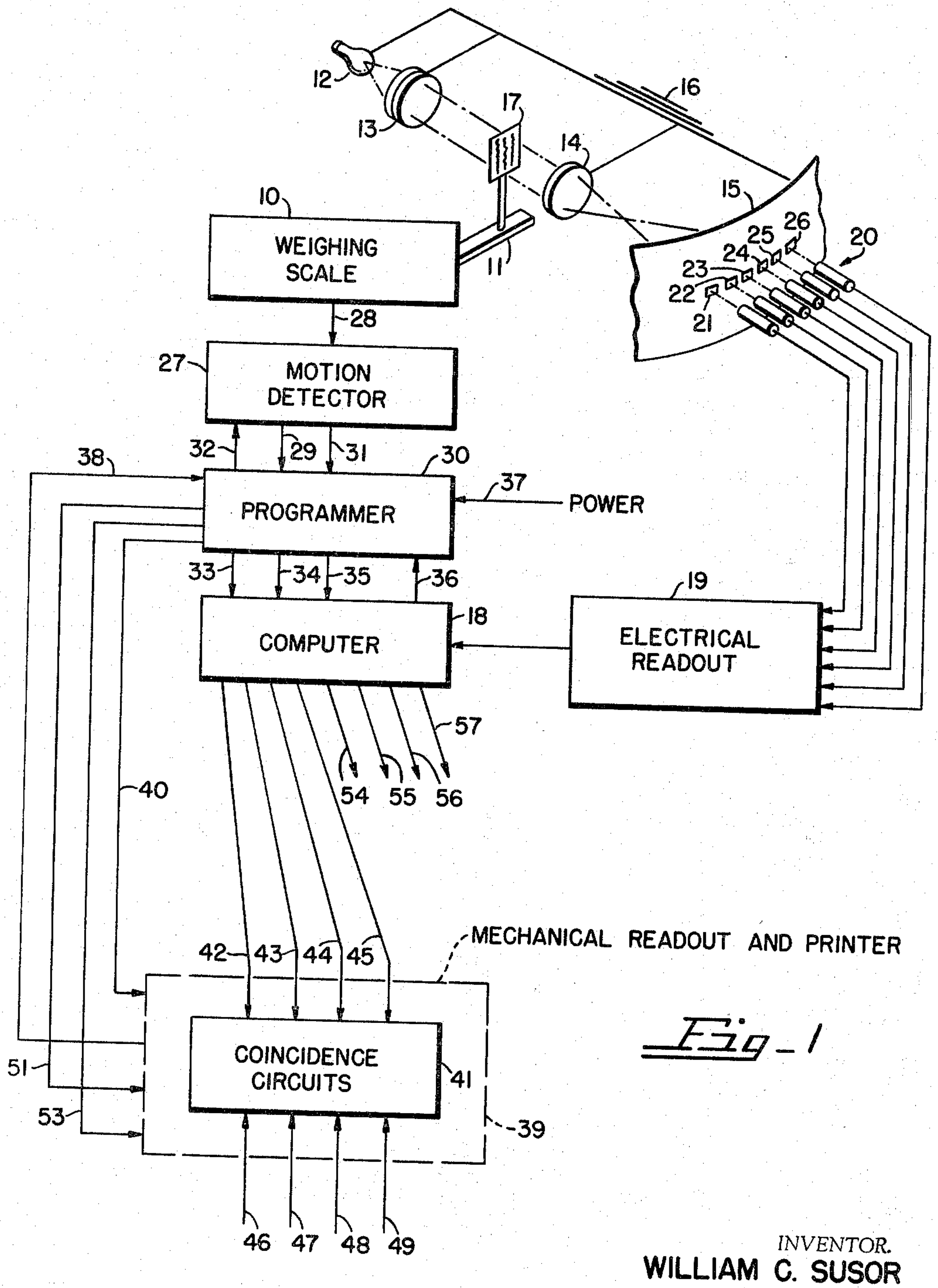
FIG. 1 is a schematic diagram illustrating the general organization of the weighing, computing and printing system with the sterling computer of the invention combined therewith.

Referring to FIG. 1, a computing weighing scale 10 includes a lever 11 and an optical projection system which diagrammatically includes a light source 12, a condensing lens 13, a projection lens 14 and a photocell mask 15. The light source 12, the lenses 13 and 14, and the mask 15 are connected to ground as shown at 16 (e.g., base of weighing scale), the mask 15 being rigidly mounted with respect to the projection optics. A coded chart 17 is moved by the load-responsive lever 11 in the optical projection system, the chart 17, hence, being condition responsive. The sterling computer 18 of the invention receives weight information from the scale and multiplies the weight of an article upon the scale by the unit price in shillings and pennies of such article to compute the value in pounds, shillings and pennies of such article. The computer 18 also multiplies such unit price times one so that it can produce a unit price output. The computer 18 has a weight input which is compatible with the parallel 1–2–4–8 binary coded decimal output of an electrical readout 19 in circuit therewith. The complete description of an analog to digital converter is not necessary to a full understanding of this invention. The above combination of weighing scale, optical projection system, electrical readout and computer is shown in the above U.S. application Ser. No. 429,230.

The chart 17 has a matrix of coded markings arranged in vertical bands so that the relative position thereof may be read by a bank of readout photocells 20, with one cell being associated with each column, providing an indication of the weight upon the scale. The output of the photocells is applied to the electrical readout 19, which makes available weight information to the input of the computer 18. The mask 15 is shown as being slitted at 21–26 so that a small and clearly defined portion of the projected image of the chart 17 is permitted to fall on each of the sensitive grids of the photocells, i.e., the mask screens out unwanted chart bits (the projection lens 14 projects all of the bits in its field of view). There is a total of fourteen photocells in the photocell bank 20, only six of the fourteen photocells being shown for the sake of simplicity. Fourteen photocells are enough to read out a chart capacity of 25 pounds.

The weighing scale 10 is connected operatively to a motion detector 27 through a connection 28 as also shown in the above U.S. application Ser. No. 429,230, the motion detector preventing erroneous weight readouts from taking place when the weighing mechanism is in motion as described in the application. The motion detector 27 applies no motion signals through a lead 29 to a programmer 30 as also shown in the above U.S. application Ser. No. 429,230. The motion detector 27 also applies motion signals through a lead 31 to the programmer 30 and receives conditioning signals from the programmer 30 through a lead 32.

The programmer 30 which is disclosed in detail in the above U.S. application Ser. No. 429,230 applies reset signals and command to compute signals through leads 33, 34 and 35, respectively, to the computer 18 and receives program advance signals through a lead 36 from the computer 18. The programmer 30 also receives power on signals through a lead 37 and coincidence check signals through a lead 38. The coincidence check signals indicate that the computer 18 and the read out positions of the number wheels in a mechanical readout and printer 39 agree. Similar coincidence check signals are described in the above U.S. application Ser. No. 429,230. The programmer 30 also applies a signal through a lead 40 to the mechanical readout and printer 39 commanding it to print.

As described in the above U.S. application Ser. No. 429,230, the programmer 30 is used in conjunction with a mechanical readout which is disclosed in U.S. application Ser. No. 416,526, filed Dec. 7, 1964, in the name of C. E. Adler. The readout includes a combination of a series of modules each comprising a detent wheel which is directly gear connected to a commutator and to a print wheel. Each module indicates the digits of a particular denominational order. When the turning print wheel appoaches the correct indicating position, a stopping latch intercepts the correct one of the teeth of the detent wheel to arrest the detent wheel. Such readout also includes coincidence circuits 41 which receive 1–2–4–8 binary coded unit price signals from the computer 18 through leads 42–45 and 1–2–4–8 binary coded decimal signals through leads 46–49 indicative of the positions of the commutators. The detent wheels and thus the print wheels are stopped when the coincidence circuits determine that the wheels are in the correct indicating positions. The readout also includes a solenoid which when it receives a signal through a lead 51 permits a new reading to be made and a solenoid which when it receives a signal through a lead 53 unlocks the unit price indicating modules which otherwise remain locked to accomplish repeat printing without recycling such unit price indicating modules. Similarly, the coincidence circuits 41 receive 1–2–4–8 binary coded decimal value signals from the computer 18 through leads 54–57 and 1–2–4–8 binary coded decimal signals through leads not shown indicative of the positions of the commutators.

Although the various logic circuits mentioned herein are in common use in the electronic control field, a brief description of the function of each circuit is as follows. An AND logic circuit produces an output signal when, and only when, all of a plurality of input signals are present. A NOT logic circuit produces an output signal at all times unless an input signal is present. A MEMORY logic circuit sometimes known as a flip flop or bistable circuit has "ON" and "OFF" or reset input terminals, and "ON" and "OFF" output terminals. The MEMORY or bistable circuit produces an "ON" output signal in response to a signal applied at the "ON" input terminal and continues to produce the "ON" output signal, even though the input signal at the "ON" input terminal is removed, until a signal is applied to the "OFF" input terminal. The MEMORY circuit will then be turned "OFF" and produce an "OFF" output signal even though the signal at the "OFF" input terminal is removed. The MEMORY circuit will revert to its initial state upon application of a signal to the "ON" input terminal. An OR logic circuit produces an output upon receiving an input signal at any of a plurality of input terminals. For further details on the construction and operation of various types of logic circuits reference is made to an article entitled, "Static Switching Devices," by Robert A. Mathias, in Control Engineering, May 1957. All of the logic circuits mentioned hereinafter, such as gates and flip flops, and the clock and diode matrix circuits are of conventional type. The connections between said circuits are clearly shown in the drawings and will not be described in detail.

Figure 2:
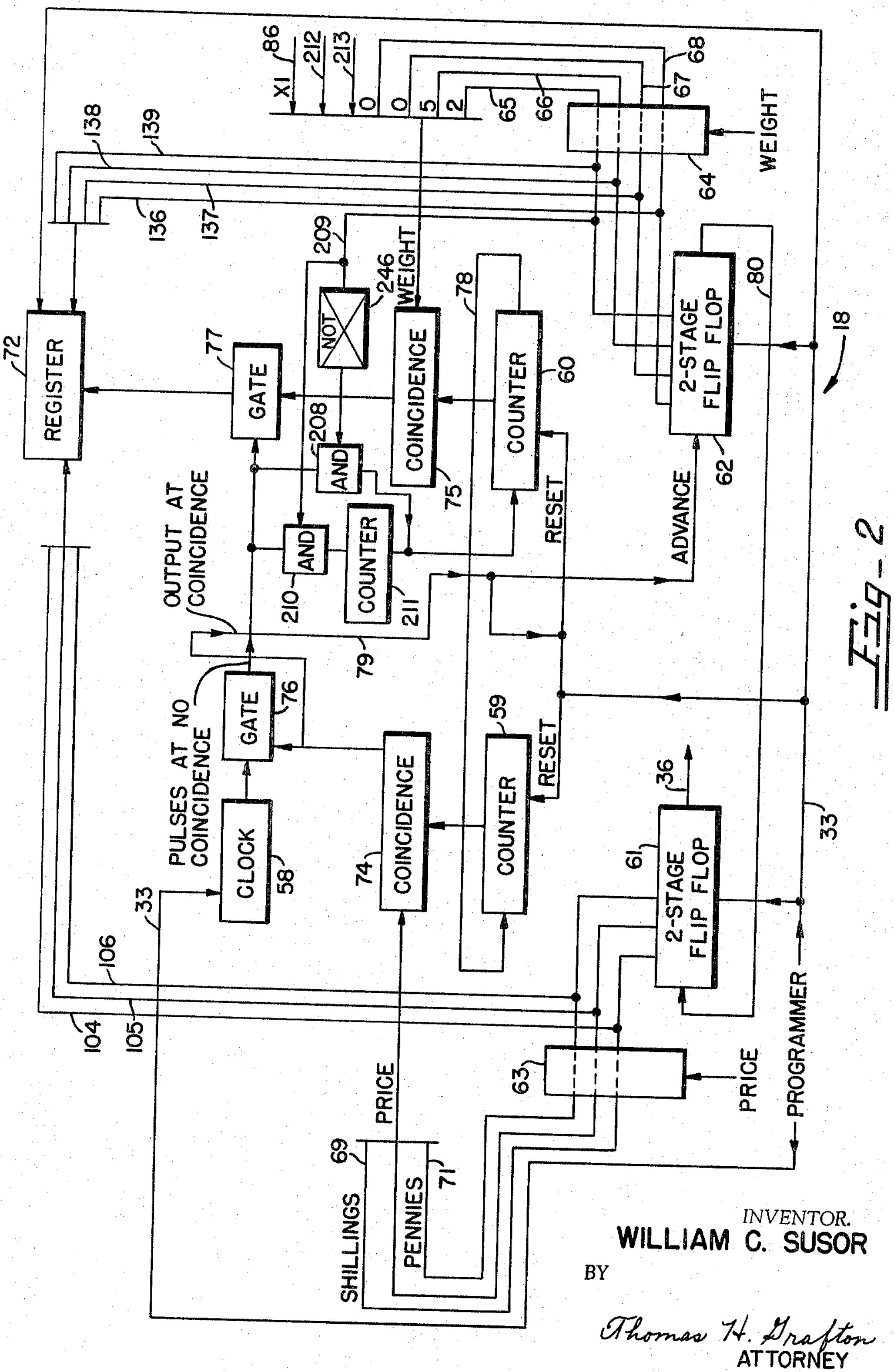
FIG. 2 is a block diagram of the sterling computer shown in FIG. 1.
Figure 3:
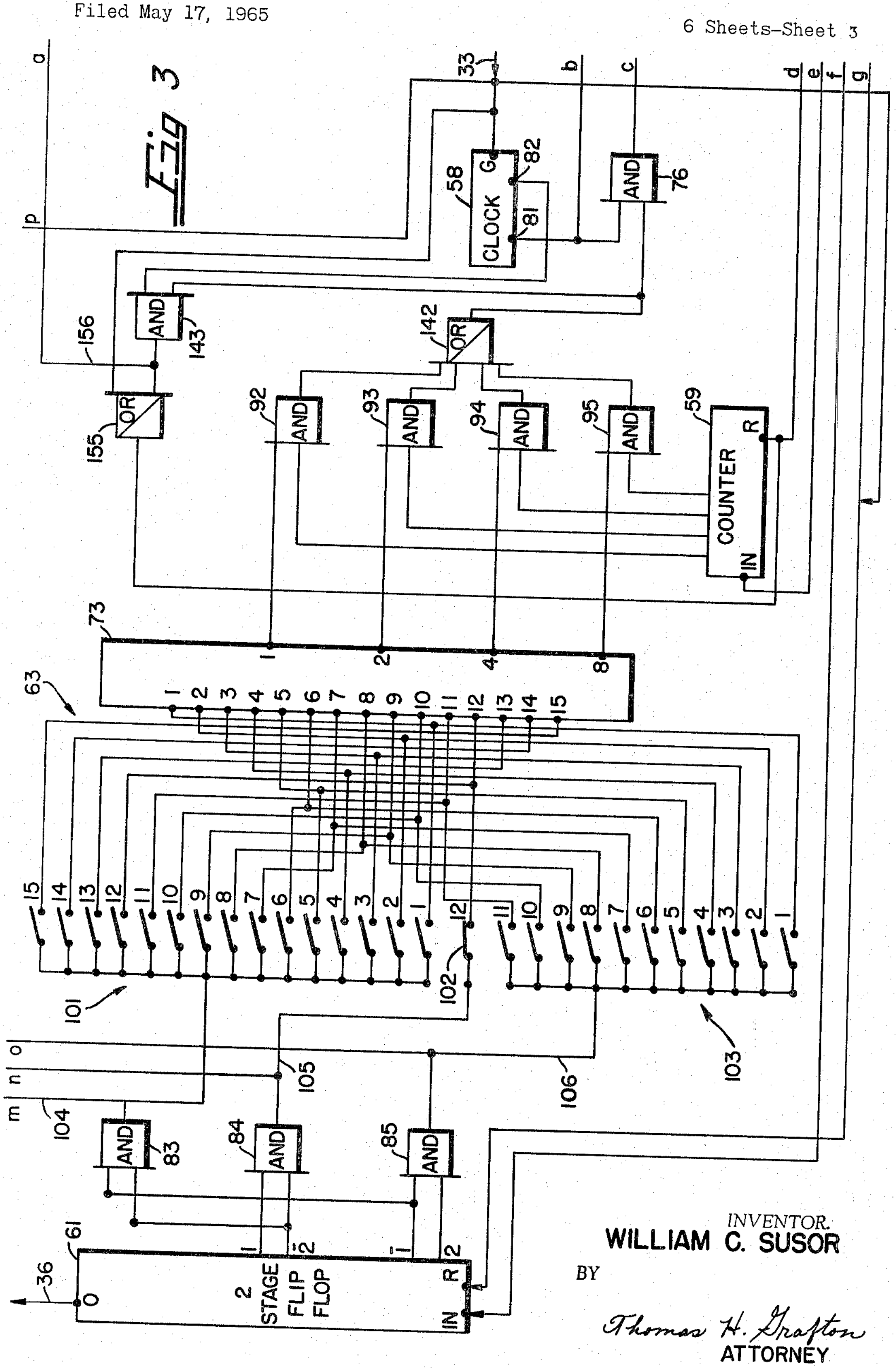
FIGS. 3, 4, 5 and 6 are detailed block diagrams of the sterling computer shown in FIG. 2.
Figure 4:
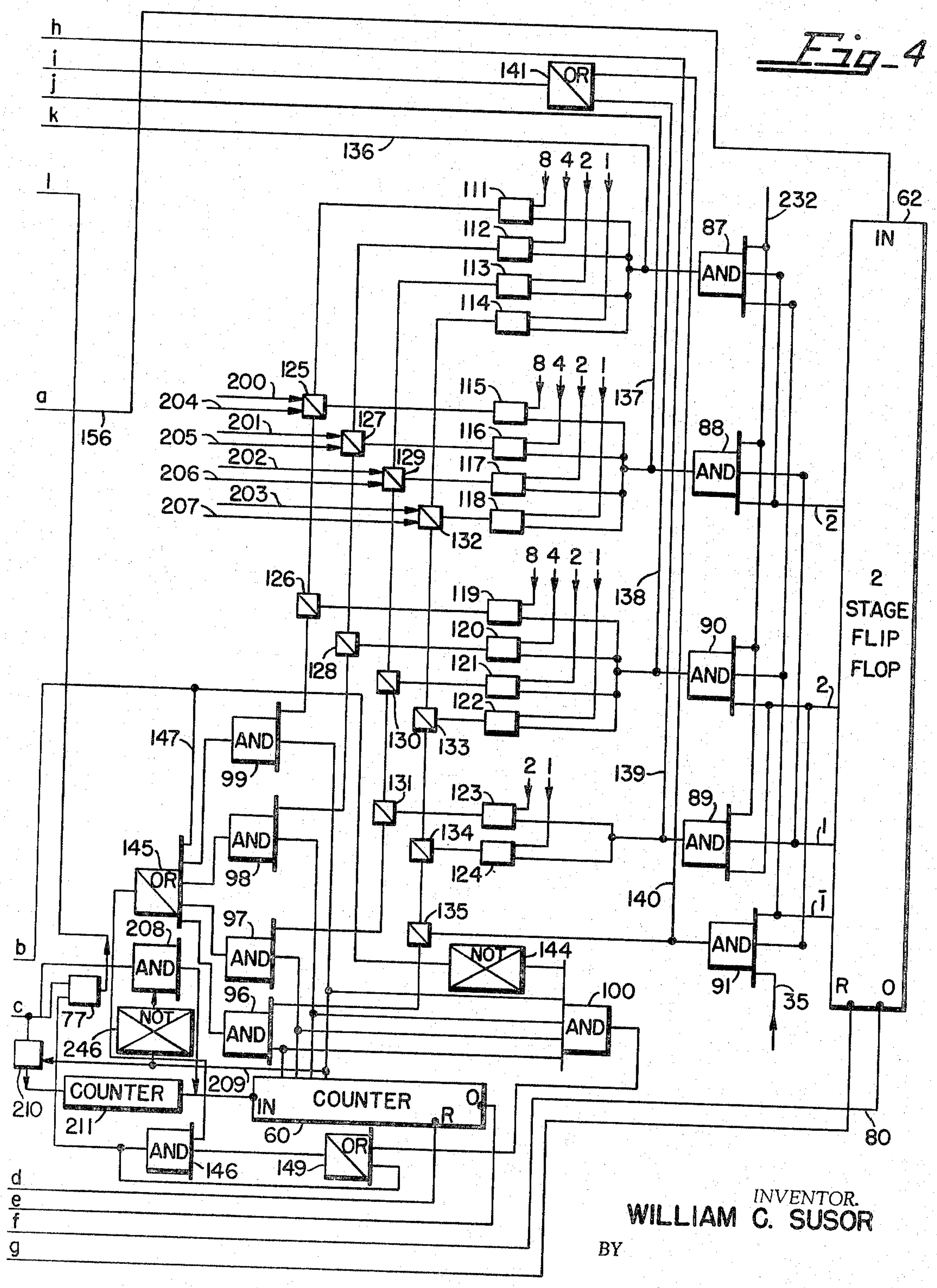
Figure 5:
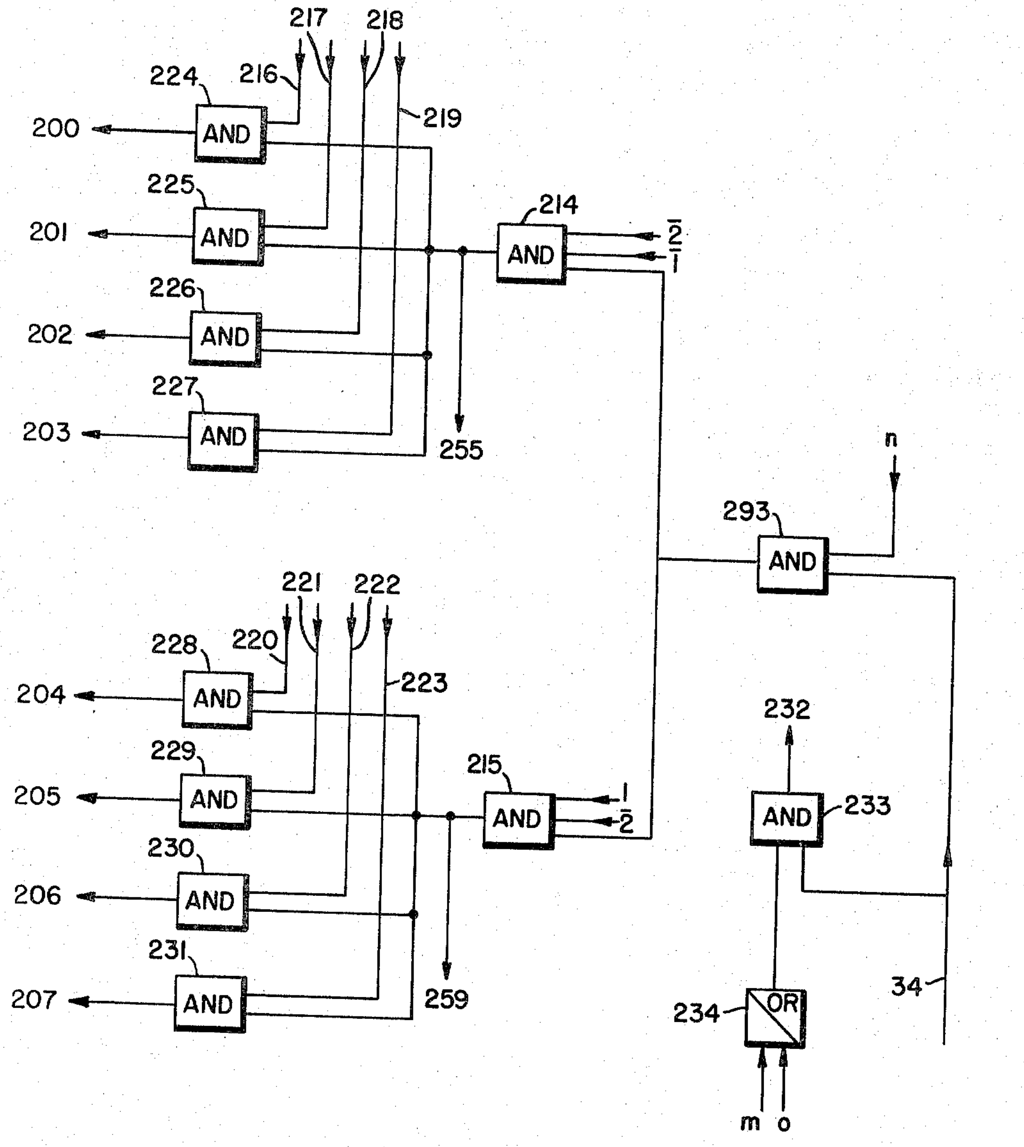
Figure 6:
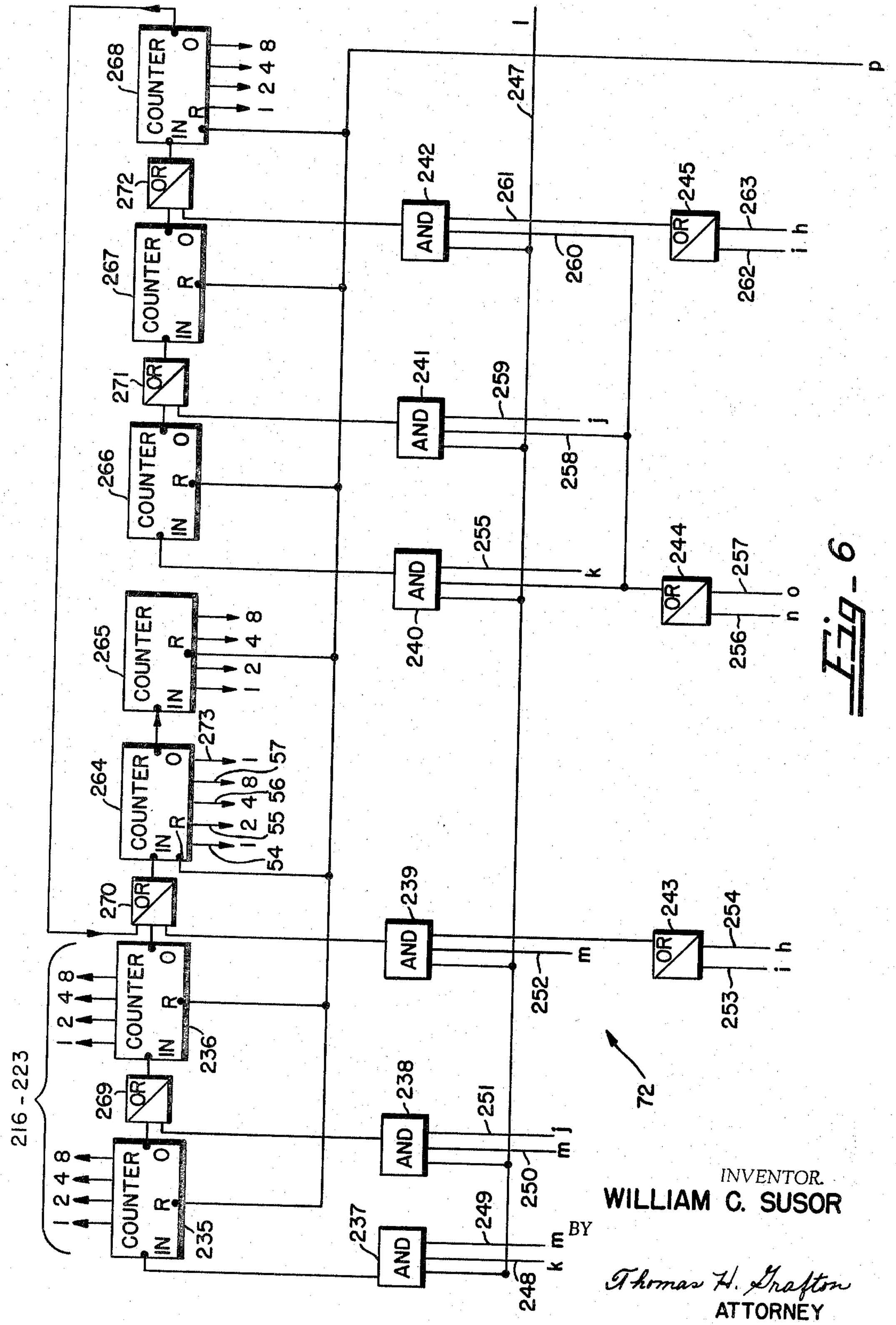

The computer 18 is shown in simplified block form in FIG. 2 and in detailed block form in FIGS. 3–6, FIG. 3 being connected to FIG. 4 at *a–g* and to FIG. 6 at *m, n, o* and *p*, FIG. 4 being connected to FIG. 6 at *h, i, j, k* and *l*, and FIG. 5 being connected to FIG. 3 at *m, n*, and *o* and to FIGS. 4 and 6 at the numbered arrowheads.

Referring to FIG. 2, the computer 18 includes a synchronized free running multivibrator or clock 58, which is gated on by a reset signal from the programmer 30 through the lead 33 (FIGS. 1–3), a conventional 1–2–4–8 binary counter 59 (counts by 16), a conventional 1–2–4–8 binary coded decimal counter 60 (counts by 10), and two two-stage flip flops 61 and 62 (bistable means), the counters 59 and 60, the two-stage flip flops 61 and 62, and a register 72 being reset at the start of a cycle by the same reset signal from the programmer 30 through the lead 33 which gates on the clock 58. Price entry is made in a price circuit 63 (first factor entering means) by moving price knobs or levers as described in the above U.S. application Serial No. 429,230 and weight entry is made in a weight circuit 64 (second factor entering means as described above, i.e., the parallel 1–2–4–8 binary coded decimal output of the electrical readout 19 (FIG. 1).

The two two-stage flip flops 61 and 62 each is identical to the two-stage flip flop shown in detail in FIG. 4 of the above U.S. application Ser. No. 429,230. The counters 59 and 60 each contain two of such two-stage flip flops, i.e., each of the two-stage flip flops 61 and 62 may be considered as half of a conventional 1–2–4–8 binary coded decimal counter which counts to three by the following code:

| 1 | 2 | 4 | 8 | Count | Binary Output |
|---|---|---|---|---|---|
| 0 | 0 | 0 | 0 | 0 | $\bar{1}$ $\bar{2}$----not 1 not 2 |
| 1 | 0 | 0 | 0 | 1 | 1 $\bar{2}$----true 1 not 2 |
| 0 | 1 | 0 | 0 | 2 | $\bar{1}$ 2----not 1 true 2 |
| 1 | 1 | 0 | 0 | 3 | 1 2----true 1 true 2 |

The weighing scale 10 (FIG. 1) has a capacity of 25 pounds. Accordingly, leads 65–68 are labeled 2, 5, 0 and 0, respectively. The price entry circuit 63 has a capacity of 15 shillings and 11 pennies. Hence, leads 69 and 71 are labeled "shillings" and "pennies," respectively. The least significant place in the weight figure is multiplied by the shillings price entry with pulse entry of the partial product made into the register 72 which includes a series of counter stages or sections that by partial products accumulation produces the final computed value figure.

Then the procedure is repeated by multiplying the next place in the weight figure by the shillings price entry and repeated again using the next place in the weight entry. Then the procedure is repeated by multiplying the most significant place in the weight figure by the shillings price entry and further by a factor of ten. Even numbers of pounds and shillings are now stored in the register and any fractional number of shillings is converted to pennies by multiplying such fractional number by twelve and storing the resulting partial product in the register. Then the procedure is repeated by multiplying the least significant place in the weight figure by the pennies price entry, then the next significant place in the weight figure by the pennies price entry, then the next significant place in the weight figure by the pennies price entry, and finally the most significant place in the weight figure by the pennies price entry and further by a factor of ten. Multiples of twelve pennies are converted to shillings in the register and the computed value is printed in pounds, shillings and pennies.

The price entry is changed to 1–2–4–8 binary code by a conventional encoder or diode matrix 73 (FIG. 3), e.g., fifteen shillings in produces a 1–2–4–8 binary coded output, and is applied to a coincidence circuit 74 (FIG. 2). The parallel 1–2–4–8 binary coded decimal weight output of the electrical readout 19 (FIG. 1) is applied to a coincidence circuit 75 (FIG. 2). At the start, with the clock 58 gated on and the counters 59 and 60 and the two-stage flip flops 61 and 62 reset, price entry upsets coincidence beween the price entry and the count in the counter 59 as detected by the coincidence circuit 74 and weight entry upsets coincidence between the weight entry and the count in the counter 60 as detected by the coincidence circuit 75. The two-stage flip flop 61 in its reset state selects the "shillings" in the selected price per pound to be multiplied first and the two-stage flip flop 62 in its reset state selects the hundredths place in the weight figure to be multiplied first.

In the no coincidence state of the coincidence circuit 74, a gate 76 permits pulses from the clock 58 to be applied to a gate 77 and through an AND gate 208 to the counter 60. The AND gate 208 is enabled by the clock pulses and by the output of a NOT gate 246 having its input so connected by a lead 209 to the two-stage flip flop 62 that it receives an input signal when the two-stage flip flop 62 is in its count three state. An AND gate 210 is enabled by the clock pulses and by the signal on the lead 209 (two-stage flip flop 62 in count three state) and the output of the enabled AND gate 210 is connected to the input of a 1–2–4–8 binary coded decimal counter 211 (counts by ten) having its output connected to the input of the counter 60. The counter 211 applies one pulse to the counter 60 for every ten pulses that it receives. When the two-stage flip flop 62 is in its count three state, an input signal is applied to the NOT gate 246 which because it has an input does not apply an input to the AND gate 208 which then is disabled. However, such input signal (on lead 209) also is applied to the partially enabled AND gate 210 (enabled by clock pulses) which then opens to pass clock pulses to the input of the counter 211. When the two-stage flip flop is not in its count three state, a reverse situation exists, i.e., AND gate 208 is open and AND gate 210 is closed. The function of the counter 211 is to multiply the product of shillings times the tens place in the weight entry by ten and the product of pennies times the tens place in the weight entry by ten. This is necessary because there are no tens counter stages in the register 72, because of the simplicity of the register 72, and accordingly when the tens place in the weight entry is multiplied by either shillings or pennies the resulting product is multiplied by ten and put in the units counter stages in the register as hereinafter described. In the no coincidence state of the coincidence circuit 75, the gate 77 is open and it passes the pulses to the register 72 to be counted. When the coincidence circuit 75 detects coincidence between the hundredths place in the weight entry and the count in the counter 60, the gate 77 is closed. However, the pulses continue to flow into the counter 60, through the open AND gate 208, which resets on the tenth pulse and also applies the tenth pulse on a lead 78 to the input of the counter 59 to advance it. The process is repeated until the coincidence circuit 74 detects coincidence. This means that if the "shillings" price entry was a four and the hundredths weight figure was a three, twleve pulses have been counted by the register, i.e., a partial product.

When the coincidence circuit 74 detects coincidence, an output from the gate 76 on a lead 79 resets the counters 59 and 60 and advances the two-stage flip flop 62 which in its count one state selects the tenths place in the weight figure to be multiplied next. The "shillings" in the price entry now is multiplied by the tenths place in the weight figure as described above with pulse entry of the partial product in the register 72 which accumulates the partial products, and another output from the gate 76 on the lead 79 resets the counters 59 and 60 and advances the two-stage flip flop 62 to its count two state.

The two-stage flip flop 62 in its count two state selects the units place in the weight figure to be multiplied next. The "shillings" in the price entry now is multiplied by the units place in the weight figure as described above with pulse entry of the partial product in the register 72 and another output from the gate 76 resets the counters 59 and 60 and advances the two-stage flip flop 62 to its count three state.

The two-stage flip flop 62 in its count three state selects the tens place in the weight figure to be multiplied next and controls, through the lead 209 and the NOT gate 246, the AND gate 208 and the AND gate 210 which gates are now closed and opened, respectively. This applies the clock pulses from the gate 76 through the open AND gate 210 to the counter 211 connected to the counter 60 resulting in multiplying by ten the result obtained by multiplying the shillings price entry by the tens place in the weight entry as described above. At this point in the cycle, i.e., shillings multiplied by weight, the coincidence circuit 74 detects coincidence and another output from the gate 76 resets the counters 59 and 60 and resets the two-stage flip flop 62 to its count zero state which as it resets applies a pulse on a lead 80 to advance the two-stage flip flop 61 to its count one state. Even numbers of pounds and shillings are now stored in the register and any fractional number of shillings is converted to pennies by multiplying such fractional number by twelve. This is accomplished by the two-stage flip flop 61 in its count one state selecting a price entry of twelve as hereinafter described to be multiplied by the fractional number of shillings which are shown added as a weight entry on leads 212 and 212 (two decimal places) in FIG. 2 (fractional number of shillings entry described hereinafter in detail), whereupon the two-stage flip flop 62 resets and applies a pulse on the lead 80 to advance the two-stage flip flop 61 to its count two state.

The two-stage flip flop 61 in its count two state selects the "pennies" in the price entry to be multiplied next. The above process is repeated until the three least significant places in the weight figure are multiplied by the "pennies" in the price entry and until the most significant place in the weight figure is multiplied by the "pennies" in the price entry and further by a factor of ten, whereupon the two-stage flip flop 62 resets and applies a pulse on the lead 80 to advance the two-stage flip flop 61 which applies an output on the lead 36 (FIGS. 1–3) to advance the programmer 30. The computed value now is stored in the register 72.

In the same manner, the computer 18 also multiplies the price entry times one (one applied on a lead 86) to produce a unit price figure which is stored in the register 72. The register 72 contains two series of counter stages one for computed value storage and the other for price storage.

Referring to FIGS. 3–6, the clock 58 has a gate terminal "G" to which the reset signal from the programmer 30 is applied through the lead 33 to gate on the clock and two output terminals 81 and 82. The clock 58 always starts negative putting such negative pulse on the terminal 81 while putting the positive portion of the pulse on the terminal 82. The two-stage flip flop 61, which is identical to the one shown in FIG. 4 of the above U.S. application Serial No. 429,230, has four output leads identified by the numbers 1, 2, 1 and 2 just as are the four output leads shown in such FIG. 4 to produce binary outputs in accordance with the code set forth in the above table. At count zero, $\bar{1}$ and $\bar{2}$ outputs enable an AND gate 83; at count one, 1 and $\bar{2}$ outputs enable an AND gate 84; and at count two, $\bar{1}$ and 2 outputs enable an AND gate 85. The two-stage flip-flop 61 also has output, in and reset terminals O, IN and R, respectively. The two-stage flip flop 62 also has four output leads identified by the numbers $\bar{2}$, 2, 1, and $\bar{1}$. At count zero, $\bar{1}$ and $\bar{2}$ outputs partially enable an AND gate 87 and an AND gate 214 (FIG. 5); at count one, 1 and $\bar{2}$ outputs partially enable an AND gate 88 and an AND gate 215 (FIG. 5); at count two, $\bar{1}$ and 2 outputs partially enable two AND gates 90 and 91; and at count three, 1 and 2 outputs partially enable AND gate 89. The two-stage flip flop 62 also has output, in and reset terminals O, IN and R, respectively. The 1–2–4–8 binary counter 59 has in and reset terminals IN and R, respectively. In the reset condition, the four output leads of the counter 59 apply four outputs to AND gates 92–95, respectively, to partially enable such gates. The 1–2–4–8 binary coded decimal counter 60 has in, reset an output terminals IN, R and O, respectively. In the reset condition, the four output leads of the counter 60 apply four outputs to AND gates 96–99, respectively, to partially enable such gates. At the same time, all outputs from the counter 60 are applied to an AND gate 100 to partially enable it. The register 72 which is shown as a single block in FIG. 2 is shown as a series of counter stages in FIG. 6 together with partial product gating hereinafter described.

Price entry is made in the price circuit 63 as shown in FIG. 2 which includes a bank of fifteen "shillings" contacts 101 (FIG. 3), a continuously closed contact 102, and a bank of eleven "pennies" contacts 103 which banks of contacts are closed by setting the price knobs or levers to selected positions. The contacts are in circuit with the respective ones of terminals 1–15 in the diode matrix 73. The AND gate 83 when enabled by the two-stage flip flop 61 being in its reset state applies an output to a lead 104 (controls partial product gating hereinafter described) and to the bank of "shillings" contacts 101; the AND gate 84 when enabled by the two-stage flip flop 61 being in its count one state applies an output to a lead 105 (controls partial product gating) and to the closed contact 102; and the AND gate 85 when enabled by the two-stage flip flop 61 being in its count two state applies an output to a lead 106 (control partial product gating) and to the bank of "pennies" contacts 103. The leads 104–106 are connected to the partial product gating shown in FIG. 6.

A price entry, e.g., a price of 1 shilling and 2 pennies, would connect a closed contact in the bank 101 to the 1 terminal of the diode matrix 73, the closed contact 102 to the 12 terminal of the diode matrix 73, and a closed contact in the bank 103 to the 2 terminal of the diode matrix 73, and is changed to 1–2–4–8 binary code by the diode matrix 73. It is to be remembered that only one bank of contacts or the contact 102 is energized at a time as programmed by the two-stage flip flop 61. When price contacts are closed, output terminals 1, 2, 4 and 8 of the diode matrix 73 apply inputs to the respective AND gates 92–95. For example, a decimal nine in produces a 1–8 binary output on output terminals 1 and 8 which is applied to AND gates 92 and 95.

Weight entry is made in a weight circuit 64 as shown in FIG. 2 which includes four AND gates 111–114 which receive the hundredths place parallel 1–2–4–8 binary coded decimal output of the electrical readout 19 (FIG. 1), four AND gates 115–118 which receive the tenths place parallel 1–2–4–8 binary coded decimal weight output, four AND gates 119–122 which receive the units place weight output, and two AND gates 123–124 which receive the tens place weight output (25 pounds weighing scale capacity). The outputs of AND gates 111 and 115 are applied through OR gates 125 and 126 to the AND gate 99 and the output of the AND gate 119 is applied through OR gate 126 to the AND gate 99. The outputs of AND gates 112 and 116 are applied through OR gates 127 and 128 to the AND gate 98 and the output of the AND gate 120 is applied through the OR gate 128 to the AND gate 98. The outputs of AND gates 113 and 117 are applied through OR gates 129–131 to the AND gate 97, the outputs of AND gate 121 is applied through the OR gates 130 and 131 to the AND gate 97, and the output of the AND gate 123 is applied through the OR gate 131 to the AND gate 97. The output of the AND gates 114 and 118 are applied through OR gates 132–135 to the AND gate 96, the output of AND gate 122 is applied through the OR gates 133–135 to the AND gate 96, the output of AND gate 124 is applied through OR gates 134 and 135 to the AND gate 96, and the output of the AND gate 91 is applied through the OR gate 135 to the AND gate 96. The function of the AND circuit 91 is not to make weight entry but to make entry of a factor of one which is multiplied by the price entry for the purpose of storing price information in the register 72. The output of AND gate 87 partially enables AND gates 111–114, the output of AND gate 88 partially enables AND gates 115–118, the output of AND gate 90 partially enables AND gates 119–122, and the output of AND gate 89 partially enables AND gates 123 and 124. AND gates 87, 88, 90, 89, and 91 also apply their outputs to leads 136–140, respectively, which are connected to the partial product gating (FIG. 5) hereinafter described. Leads 138 and 140 are in circuit with the input of an OR gate 141.

After even numbers of pounds and shillings are stored in the register 72, any fractional number of shillings is converted to pennies by multiplying such fractional number by twelve. This is accomplished by the two-stage flip flop 61 in its count one state selecting the closed contact 102 to multiply twelve times the fractional shilling which is entered as a 1–2–4–8 binary coded weight entry to leads 216–219 (hundredths place) and to leads 220–223 (tenths place) from the register 72. The leads 216–223 are shown in FIG. 5. Four AND gates 224–227 receive the hundredths place entry of the fractional shilling, and four AND gates 228–231 receive the tenths place entry of the fractional shilling, the AND gates 224–231 being so connected to leads 200–207 in FIG. 4 that the outputs of AND gates 224 and 228 are applied as inputs to OR gate 125, the outputs of AND gates 225 and 229 are applied as inputs to OR gate 127, the outputs of AND gates 226 and 230 are applied as inputs to OR gate 129, and the outputs of AND gates 227 and 231 are applied as inputs to OR gate 132.

As described in connection with FIG. 2, at the start of a cycle, the clock 58 is gated on and the counters 59 and 60, the two-stage flip flops 61 and 62, and the register are reset by the reset signal from the programmer through the lead 33. At count zero, the $\bar{1}$ and $\bar{2}$ outputs of the reset flip flop 61 enable the AND gate 83 as described above to select the "shillings" in the price per pound to be multiplied first. Price entry is made as described above producing the 1–2–4–8 binary coded decimal output from the diode matrix 73. The coincidence circuit 74 shown in FIG. 2 includes the AND gates 92–95 and an OR gate 142 shown in FIG. 3. At count zero, the reset counter 59 has four outputs which partially enable the four AND gates 92–95. Price entry completely enables the respective ones of the AND gates 92–95 as described above and the outputs of the enabled AND gates 92–95 are applied to the OR gate 142 which in turn delivers an input to the AND gate 76 (FIGS. 2 and 3). When this output from the OR gate 142 ceases, the change in state is used as an input to an AND gate 143. Price entry upsets coincidence between the price entry and the count in the counter 59 as detected by the coincidence circuit and clock pulses are passed by the AND gate 76 as long as coincidence does not exist, the AND gate 76 being enabled by the outputs of the OR gate 142 and the clock 58. As described above, price entry except for zeroes in the price figure is made by closing selected ones of the contacts 101 and 103. No contacts are needed for the "0" places in the price figure because coincidence already exists between the AND gates 92–95 and the count in the counter 59 when a "0" is selected to in effect multiply the weight entry by zero putting no pulses in the register 72 as the computer steps through its cycle.

At count zero, the $\bar{1}$ and $\bar{2}$ outputs of the reset two-stage flip flop 62 partially enable the AND gate 87 which is completely enabled by a signal on a lead 232. However, before this happens a command from the programmer 30 to multiply one times price is applied to the computer from the lead 35 (FIGS. 1 and 4). Since multiplying one times price is done in the same manner as multiplying weight times price, for the sake of simplicity, the process will not be described except to note that at the beginning of the cycle when one is to be multiplied by price the two-stage flip flop 62 is in its count zero stage partially enabling the AND gate 87 which is not completely enabled because there is no input on the lead 232 resulting in zero being multiplied by price, then the two-stage flip flop 62 is advanced to its count one state with the same result, then the two-stage flip flop 62 is advanced to its count two state resulting in partial enabling of AND gates 90 and 91 with the same result as to AND gate 90, and then the two-stage flip flop 62 is advanced to its count three state with the same result. The partially enabled AND gate 91 is completely enabled by the command to multiply one times price on the lead 35 and the output of the enabled AND gate 91 is applied to the lead 140 (controlling partial product gating hereinafter described) and to the OR gate 135 which applies an input to the AND gate 96, whereupon one is multiplied times price as hereinafter described in connection with a description of multiplying weight times price. The unit price figure is stored in the register 72 in the same manner as the computed value figure is stored in the register. The register 72 contains one series of counter stages for storing the unit price figure and another for storing the computed value figure. For the sake of simplicity, only one series of counter stages is shown in FIG. 6. However, as shown in FIG. 1, leads 42–45 extend from the unit price counter stages and leads 54–57 extend from the computed value counter stages. As above described, the readout 39 (FIG. 1) includes coincidence circuits 41 which receive 1–2–4–8 binary coded unit price signals from the computer 18 through leads 42–45, i.e., from one series of counter stages, and 1–2–4–8 binary coded decimal value signals through leads 54–57, i.e., from the other respective series of counter stages.

After the selected price figure has been stored in the register 72, the price entry is multiplied again but this time by the weight entry to obtain the computed value. First, the clock 58 is gated on and the counters 59 and 60, the two-stage flip flops 61 and 62, and the register 72 are reset by the reset signal from the programmer 30 through the lead 33 and later the computer 18 receives the command to multiply weight times price on the lead 34 (FIGS. 1 and 5) from the programmer 30 partially enabling an AND gate 233 which is completely enabled by an input from an OR gate 234 that in turn has two inputs connected to leads 104 and 106 (FIG. 3). Lead 104 (FIG. 3) connects the output of enabled AND gate 83 to the input of OR gate 234 (FIG. 5). The enabling of AND gate 233 partially enables AND gates 87–90 (FIG. 4), the AND gates 233 and 87–90 being connected by means of the lead 232. At the count zero, the $\bar{1}$ and $\bar{2}$ outputs of the reset two-stage flip flop 62 completely enable the partially enabled AND gate 87. The enabled AND gate 87 applies its output to the lead 136 (controlling partial product gating hereinafter described) and to the inputs of AND gates 111–114 to select the hundredths place in the weight figure to be multiplied first. As above described, the hundreths place parallel 1–2–4–8 binary coded decimal output of the electrical readout 19 (FIG. 1), i.e., the weight entry, completely enables the respective ones of the AND gates 111–114 to in turn cause the respective AND gates 96–99 to be enabled, the four outputs from the reset counter 60 having already partially enabled such AND gates 96–99. The coinicidence circuit 75 in FIG. 2 includes the AND gates 96–100, a NOT gate 144, and an OR gate 145. Weight entry completely enables the respective ones of the AND gates 96–99 as described above and the outputs of the enabled AND gates 96–99 are applied to the OR gate 145 which in turn delivers an input to an AND gate 146 partially enabling it. No weight entry for the "0" places in the weight figure is needed because coincidence already exists between the AND gates 96–99 and the count in the counter 60 before a weight entry is made to in effect multiply the price entry by zero putting no pulses in the register 72 as the computer steps through its cycle.

The negative pulse from the clock 58 also is applied to the NOT gate 144 which inverts the signal and applies it to the AND gate 100 which already is partially enabled by the four outputs of the reset counter 60 and the pulse from the clock 58 when it goes positive enables the OR gate 145 by way of a lead 147 if the OR gate 145 is not enabled already. The enabled AND gate 100 applies its output to an OR gate 149 having its output connected to the AND gate 146. The output of the AND gate 76 is connected to an input of the AND gate 77 (FIGS. 2 and 4), the output of the AND gate 77 being connected to inputs of AND gates 237–242 of the partial product gating shown in FIG. 6. The output of the AND gate 76 also is connected to the "IN" terminal of the counter 60 through AND gate 210 and the counter 211 in one route and through AND gate 208 in another route as described above. At this stage in the cycle as also described above, AND gate 208 is open and AND gate 210 is closed.

The AND gate 146 which is enabled by inputs from the OR gates 145 and 149 enables the partially enabled AND gates 77 which passes clock pulses to be counted by the register 72 and the AND gate 76 applies pulses to be counted to the counter 60 through the AND gate 208. Accordingly, as long as the coincidence circuit detects a condition of no coincidence between the weight entry and the count in the counter 60 pulses pass to the register 72 and to the counter 60. That is, weight entry upsets coincidence. When the count in the counter 60 reaches a state where the 1–2–4–8 coded output of the counter agrees with the 1–2–4–8 weight code set up on the AND gates 96–99, the respective counter outputs to the enabled ones of the AND gates 96–99 are cut off and such AND gates 96–99 are disabled and no outputs are applied by such AND gates 96–99 to the OR gate 145 (coincidence). As soon as the next clock pulse starts going negative, this signal is applied to the OR gate 145 through the lead 147 to disable it which in turn causes the AND gate 146 to be disabled. This in turn causes the AND gate 77 connected to the disabled AND gate 146 to close cutting off pulses to the register 72. However, pulses still flow from the AND gate 76 to the counter 60 which resets on the tenth pulse and applies such tenth pulse to the "IN" terminal of the counter 59 to advance it.

The OR gate 149 is a holding circuit which keeps the AND gate 146 on until it loses its input from the OR gate 145 because the output of the AND gate 146 is applied to the OR gate 149 which has its output in turn connected to the input of the AND gate 146. The counter 60 counts as soon as it receives a pulse that is starting to go positive. The OR gate 145 drops out as far as it is enabled by the positive pulse from the clock 58 on lead 147 as soon as the pulse starts going negative. This delay after coincidence between the count in the counter 60 and the weight entry set up on the AND gates 96–99 has been attained ensures full pulse count by not closing the AND gate 77, which is connected to the OR gate 145 through the AND gate 146, until it is certain that the register 72 has received the last pulse to be counted. This prevents a clock pulse from being cut short by the AND gate 77 when it is disabled. When the counter 60 is reset (resets and applies four outputs to the AND gate 100 as soon as it receives the tenth positive pulse), the AND circuit 100 is disabled by a negative input signal applied to it by the NOT gate 144. This ensures that the tenth pulse is not counted by the register 72.

Reset of the counter 60 upsets coincidence between its count and the weight entry and the process is repeated until the counter 59 is advanced to a point where its 1–2–4–8 coded output agrees with the 1–2–4–8 code set up on the AND gates 92–95. The respective counter outputs to the enabled ones of the AND gates 92–95 are cutoff and such AND gates 92–95 are disabled and no outputs are applied by such AND gates 92–95 to the OR gate 142 (coincidence). This means that, if the "shillings" in the price entry was a two and the hundredths place in the weight entry was a four, eight pulses have been counted by the register 72, i.e., a partial product.

When coincidence circuit 74 (AND gates 92–95 and counter 59) detects coincidence, the output from the OR gate 142 changes sign and this input is applied to the AND gate 143 which already is enabled by the output from the clock 58. The enabled AND gate 143 enables an OR gate 155 and applies an advance signal on a lead 156 connected to the "IN" terminal of the two-stage flip flop 62 to advance it to its count one state. An input of the OR gate 155 also is connected to the lead 33 on which reset signals are applied from the programmer 30. The enabled OR gate 155 resets both counters 59 and 60 by applying reset signals to terminals "R" of such counters. The two-stage flip flop 62 in its count one state selects the tenths place in the weight figure to be multiplied next (1 and $\bar{2}$ outputs together with the signal on the lead 232 enable the AND gate 88). The "shillings" in the price entry now is multiplied by the tenths place in the weight figure as described above with pulse entry of the partial product in the register 72 which accumulates the partial products, and another output from the AND gate 143 resets the counters 59 and 60 and advances the two-stage flip flop 62 to its count two state.

The two-stage flip flop 62 in its count two state selects the units place in the weight figure to be multiplied next ($\bar{1}$ and 2 outputs together with the signal on the lead 232 enable the AND gate 90). The "shillings" in the price entry now is multiplied by the units place in the weight figure as described above with pulse entry of the partial product in the register 72 and another output from the AND gate 143 resets the counters 59 and 60 and advances the two-stage flip flop 62 to its count three state.

The two-stage flip flop 62 in its count three state selects the tens place in the weight figure to be multiplied next (1 and 2 outputs together with the signal on the lead 232 enable the AND gate 89). The "shillings" in the price entry now is multiplied by the tens place in the weight figure as described above with the difference that it also is multiplied by a factor of ten by applying the clock pulses through the AND gate 210 and the counter 211 to the counter 60, i.e., ten pulses applied to counter 211 produce one pulse applied to counter 60 as described above, with pulse entry of the partial product into the register 72 and another output from the AND gate 143 resets the counters 59 and 60 and resets the two-stage flip flop 62 to its count zero state which as it resets applies a pulse on the lead 80 (FIGS. 2–4) to advance the two-stage flip flop 61 to its count one state.

The two-stage flip flop 61 in its count one state (1 and $\overline{2}$ outputs enable the AND gate 84) selects the closed contact 102 to convert fractional shillings in the computed value to pennies. The closed contact 102 is connected to the 12 input terminal of the encoder 73 which enters a binary coded price input (4–8) to be multiplied by the fractional shilling that is entered as a 1–2–4–8 binary coded weight entry (comes from a hundredths shillings place counter 235 which is part of the register 72 shown in FIG. 6 to be described hereinafter) to leads 216–219 (FIG. 5) and as a 1–2–4–8 binary coded weight entry (comes from a tenths shillings place counter 236 which is part of the register 72) to leads 220–223 (FIG. 5). These weight entries are applied by the AND gates 224–231 to the OR gates 125, 127, 129 and 132 in FIG. 4 and are multiplied in exactly the same manner as were the weight entries applied to such OR gates by the AND gates 111–118 as described above in connection with multiplying the shillings price entry times the weight entry. Connecting the closed contact 102 to the 12 input terminal of the encoder 73 connects the output of the enabled AND gate 84 to the input of an AND gate 293 (FIG. 5), lead 105 connecting such AND gates 84 and 293, and cuts off the input to the OR gate 234 through the lead 104 disabling the AND gate 233. The partially enabled AND gate 237 is enabled by the command to compute a signal on the lead 34 from the programmer 30 and the output from the enabled AND gate 293 is applied as inputs to the AND gates 214 and 215 which are completely enabled as described above by the two-stage flip flop 62 in its $\overline{1}$–$\overline{2}$ and 1–$\overline{2}$ states, respectively. The enabled AND gates 214 and 215 apply their outputs to leads 255 and 259 (FIG. 6) to control portions of the partial products gating as hereinafter described. The two-stage flip flop 61 in its count one state (1 and $\overline{2}$ outputs enable the AND gate 84) selects the closed contact 102 to enter a twelve in the price entry and the two-stage flip flop 62 in its count zero state ($\overline{1}$ and $\overline{2}$ outputs enable the AND gate 214) and later in its count one state (1 and $\overline{2}$ outputs enable the AND gate 215) selects the hundredths and tenths places, respectively, in the fractional shilling portion of the computed value to be entered as a weight entry. After the fractional shilling entry is multiplied by twelve, the two-stage flip flop 62 resets as described above and applies a pulse on the lead 80 to advance the two-stage flip flop 61 to its count two state.

The two-stage flip flop 61 in its count two state ($\overline{1}$ and 2 outputs enable the AND gate 85) selects the "pennies" in the price entry to be multiplied next. The above procedure for multiplying the shilling price entry times the weight entry is repeated to multiply the pennies price entry times the weight entry, whereupon the two-stage flip flop 62 resets and applies a pulse on the lead 80 to advance the two-stage flip flop 61 which then applies an output on the lead 36 (FIGS. 1–3) to advance the programmer 30. The computed value in pounds, shillings, and pennies now is stored in the register 72.

As described above, leads 104–106 are connected to partial product gating shown in FIG. 6 which includes the AND gates 237–242 and three OR gates 243–245. The AND gate 237 is enabled by clock pulses from the AND gate 77 (FIG. 4) carried by a lead 247 and inputs on leads 248 and 249 connected at $k$ and $m$, respectively, to the portions of the circuit shown in FIGS. 4 and 3, respectively. The AND gate 238 is enabled by clock pulses on the lead 247 and inputs on leads 250 and 251 connected at $m$ and $j$, respectively, to the portions of the circuit shown in FIGS. 3 and 4 respectively. The AND gate 239 is partially enabled by clock pulses on the lead 247 and an input on lead 252 connected at $m$ to the portion of the circuit shown in FIG. 3. The AND gate 239 is completely enabled by the output of the OR gate 243 which is enabled in turn by inputs on leads 253 and 254 connected at $i$ and $h$, respectively, to the portions of the circuit shown in FIG. 4. The AND gate 240 is partially enabled by clock pulses on the lead 247 and an input on lead 255 connected at $k$ to the portion of the circuit shown in FIG. 4. The AND gate 240 is completely enabled by the output of the OR gate 244 which is enabled in turn by inputs on leads 256 and 257 connected at $m$ and $o$, respectively, to the portions of the circuit shown in FIG. 3. The AND gate 241 is enabled by clock pulses on the lead 247 and inputs on leads 258 and 259 connected, respectively, to the output of the OR gate 244 and at $j$ to the portions of the circuit shown in FIG. 4. The AND gate 242 is partially enabled by clock pulses on the lead 247 and by an input on a lead 260 connected to the output of the OR gate 244. The AND gate 242 is completely enabled by an output from the OR gate 245 which in turn is enabled by inputs on leads 262 and 263 connected at $i$ and $h$, respectively, to the portions of the circuit shown in FIG. 4.

The register 72 includes a series of counter stages that by partial product accumulation produces the final computed value figure. The register 72 includes the 1–2–4–8 binary coded decimal counter 235 (counts by ten) which accumulates the hundredths computed value place in the shillings that is entered as a weight entry to be multiplied by twelve (converted to pennies) in AND gates 224–227 (FIG. 5) by way of leads 216–219 as described above; the 1–2–4–8 binary coded decimal counter 236 (counts by ten) which accumulates the tenths computed value place in the shillings that is entered as a weight entry to be multiplied by twelve (converted to pennies) in AND gates 228–231 (FIG. 5) by way of leads 220–223 as described above; a 1–2–4–8–16 binary counter 264 (counts by twenty) which accumulates the units computed value place in the shillings; a 1–2–4–8 binary coded decimal counter 265 which accumulates the pounds computed value place; a 1–2–4–8 binary coded decimal counter 266 (counts by ten) which accumulates the hundredths computed value place in the pennies; a 1–2–4–8 binary coded decimal counter 267 (counts by ten) which accumulates the tenths place in the pennies; and a 1–2–4–8 binary coded decimal counter 268 (counts by twelve) which accumulates the units computed value place in the pennies. Each of the counters 235–236 and 264–268 includes input, reset and output terminals "IN," "R" and "O," respectively. The reset terminals "R" of the counters are connected to the programmer reset lead 33 (see lead end $p$).

The input terminal of the counter 235 is connected to the output of the AND gate 237 and the output terminal of the counter 235 is connected to an input of an OR gate 269, a second input of the OR gate 269 being connected to the output of the AND gate 238. The input terminal of the counter 236 is connected to the output of the OR gate 269 and the output terminal of the counter 236 is connected to an input of an OR gate 270, a second input of the OR gate 270 being connected to the output of the AND gate 239 and a third input of the OR gate 270 being connected to the output terminal of the counter 268. The input terminal of the counter 264 is connected to the output of the OR gate 270 and the output terminal of the counter 264 is connected to the input terminal of the counter 265. The input terminal of the counter 266 is connected to the output of the AND gate 240 and the output terminal of the counter 266 is connected to an input of an OR gate 271, a second input of the OR gate 271 being connected to the output of the AND gate 241.

The input terminal of the counter 267 is connected to the output of the OR gate 271 and the output terminal of the counter 267 is connected to an input of an OR gate 272, a second input of the OR gate 272 being connected to the output of the AND gate 242. The input terminal of the counter 268 is connected to the output of the OR gate 272. As mentioned above, the output terminal of the counter 268 is connected to an input terminal of the OR gate 270.

The output of the AND gate 237 fills the counter 235 (hundredths place in shillings) until it resets at the tenth pulse which spills over through the OR gate 269 to the counter 236 (tenths place in shillings), the output of the AND gate 238 applied through the OR gate 269 also helping to fill the counter 236. The counter 236 resets at the tenth pulse which spills over through the OR gate 270 to the counter 264 (units place in shillings), the output of the AND gate 239 applied through the OR gate 270 and the output of the counter 268 (units place in pennies) applied through the OR gate 270 also helping to fill the counter 264 (counter 268 resets at the twelfth pulse which spills over to the counter 264 to convert twelve pennies to one shilling). The counter 264 resets at the twentieth pulse which spills over to the counter 265 (pounds) to convert twenty shillings to one pound. The counter 266 resets at the tenth pulse which spills over through the OR gate 271 to the counter 267 (tenths place in pennies), the output of the AND gate 241 applied through the OR gate 271 also helping to fill the counter 267. The counter 267 resets at the tenth pulse which spills over through the OR gate 272 to the counter 268 (units place in pennies), the output of the AND gate 242 applied through the OR gate 272 also helping to fill the counter 268. The counter 268 resets at the twelfth pulse which spills over to the counter 264 through the OR gate 270 to convert twelve pennies to one shilling.

Counters 235–236 and 264 accumulate the 0.0X, 0.X and X.0 decimal places in the shillings, respectively, counter 265 accumulates the pounds, and counters 266–268 accumulate the 0.0X, 0.X and X.0 decimal places in the pennies. Counters 266 and 267 are not used in indicating the end result, i.e., the hundredths and tenths places in the pennies are dropped. However, counter 267 can be preset with five counts in order to round off to the next higher penny. Counters 235–236 each puts a 1–2–4–8 binary coded decimal output on its four output leads. As described above, the output leads of counter 235 are connected to leads 216–219 (FIG. 5) and the output leads of counter 236 are connected to leads 220–223 in order to enter the fractional shillings as a weight entry to be multiplied by a factor of twelve to convert the fractional shilling to pennies. Counter 264 which comprises 1–2–4–8 binary coded decimal counting stages plus a flip-flop stage (counts by twenty) puts a 1–2–4–8 binary coded decimal output on the four of its five output leads identified as 54–57 in FIG. 6 and shown as the four leads 54–57 in FIG. 1. As above described, there are a commutator and a print wheel for each set of four output leads in the mechanical readout and printer 39 which are set up in accordance with the computed value count accumulated in the register 72. As also described above, there are a commutator and a print wheel for each set of four output leads 42–45 (FIG. 1) which are set up in accordance with the unit price count accumulated in the register 72. Counter 264, however, presents a special problem because it counts by twenty and the standard print wheels have only twelve printing positions. Accordingly, the count is divided into two parts, with two commutators and two print wheels being used to set up and print the tens and units digits in the shillings. The units are set up by the 1–2–4–8 binary coded decimal output on leads 54–57 and the tens are set up by a binary 1 or 0 on a lead 273 which is the output of the last flip-flop stage in the counter 264. A count of fourteen shillings in the counter 264, for example, puts a binary one output on the lead 273 to set up a one on the respective print wheel and a four output on the lead 56 to set up a four on the respective print wheel resulting in the figure "14" being printed by the two juxtaposed print wheels. For the sake of simplicity, the lead 273 and the output leads of counters 265 and 268 are not shown in FIG. 1. Counters 265 and 268 each puts a 1–2–4–8 binary coded decimal output on its four output leads to set up its respective print wheel in the same manner as the print wheel which corresponds to counter leads 54–57 is set up.

When computing a value, the two-stage flip flop 61 selects in sequence the "shillings," the fractional shillings-to-pennies conversion factor of twelve, and the "pennies" to be multiplied one at a time by enabling in sequence the AND gates 83–85 and also selects the proper gates in the partial product gating by such enabling in sequence the AND gates 83–85 which have their outputs connected to leads 104–106, respectively. The two-stage flip flop 62 selects in sequence the hundredths, tenths, units and tens places in the weight entry to be multiplied one at a time by enabling in sequence the AND gates 87, 88, 90 and 89 and also selects the proper gates in the partial product gating by such enabling in sequence the AND gates 87, 88, 90 and 89 which have their outputs connected to leads 136–139. The two-stage flip flop 61 also controls the entry of the fractional shilling value as a weight entry as shown in FIG. 5 (leads 104–106 connected to the circuitry shown in FIG. 5 at *m*, *n* and *o*) and the two-stage flip flop 62 also controls the entry of such fractional shilling value as a weight entry as shown in FIG. 5 (AND gates 214–215 partially enabled by $\bar{2}$ and $\bar{1}$, and 1 and $\bar{2}$ flip flop outputs, respectively).

Enabling of AND gate 83 (FIG. 3) and enabling of AND gate 87 (FIG. 4) to multiply shillings times the hundreths place in the weight entry partially enables partial product gating AND gate 237 (FIG. 6). The AND gate 237 is completely enabled by clock pulses on lead 247 and passes clock pulses to be counted to the 0.0X shillings counter 235. Enabling of AND gate 83 and AND gate 88 to multiply shillings times the tenths place in the weight entry partially enables partial product gating AND gate 238. The AND gate 238 is completely enabled by clock pulses on lead 247 and passes clock pulses to be counted to the 0.X shillings counter 236. Enabling of AND gate 83 and AND gate 90 to multiply shillings times the units place in the weight entry partially enables partial product gating AND gate 239. The AND gate 239 is completely enabled by clock pulses on lead 247 and passes clock pulses to be counted to the X.0 shillings counter 264. Enabling of AND gate 83 and AND gate 89 to multiply shillings times the tens place in the weight entry times ten also partially enables partial product gating AND gate 239. AND gate 239 is completely enabled by clock pulses on lead 247 and passes clock pulses to be counted to the X.0 shillings counter 264.

Enabling of AND gate 84 (FIG. 3) and enabling of AND gate 214 (FIG. 5) to multiply twelve times the hundredths place in the shilling computed value partially enables partial product gating AND gate 240 (FIG. 6). AND gate 240 is completely enabled by clock pulses on lead 247 and passes clock pulses to be counted to the 0.0X pennies counter 266. Enabling of AND gate 84 and enabling of AND gate 215 to multiply twelve times the tenths place in the shilling computed value partially enables partial product gating AND gate 241. AND gate 241 is completely enabled by clock pulses on lead 247 and passes clock pulses to be counted to the 0.X pennies counter 267.

Enabling of AND gate 85 (FIG. 3) and enabling of AND gate 87 (FIG. 4) to multiply pennies times the hundredths place in the weight entry partially enables partial product gating AND gate 240 (FIG. 6). The AND gate 240 is completely enabled by clock pulses on lead 247 and passes clock pulses to be counted to the 0.0X pennies counter 266. Enabling of AND gate 85 and AND gate 88 to multiply pennies times the tenths place in the weight entry partially enables partial product gating AND gate 241. The AND gate 241 is completely enabled by clock pulses on lead 247 and passes clock pulses to be counted to the 0.X pennies counter 267. Enabling of AND gate 85 and AND gate 90 to multiply pennies times the units place in the weight entry partially enables partial product gating AND gate 242. The AND gate 242 is completely enabled by clock pulses on lead 247 and passes clock pulses to be counted to the X.0 pennies counter 268. Enabling of AND gate 85 and AND gate 89 to multiply pennies times the tens place in the weight entry times ten also partially enables partial product gating AND gate 242. AND gate 242 is completely enabled by clock pulses on lead 247 and passes clock pulses to be counted to the X.0 pennies counter 268.

Taking as an example in which the counter 267 is not preset as described above, in multiplying 15 shillings and 11 pennies times 11.11 pounds which equals 8 pounds, 16 shillings and 10 pennies, the one in the hundredths weight place is multiplied by 15 (shillings), the one in the tenths weight place is multiplied by 15 (shillings), the one in the units weight place is multiplied by 15 (shillings), and then the one in the tens weight place is multiplied by 15 (shillings) and also by a factor of 10. Fifteen pulses are fed to 0.0X shillings counter 235 (one in the hundreds weight entry times 15 shillings), fifteen pulses are fed to 0.X shillings counter 236 (one in the tenths weight entry times 15 shillings), fifteen pulses are fed to X.0 shillings counter 264 (one in the units weight entry times 15 shillings), and one hundred and fifty additional pulses are fed to X.0 shillings counter 264 (one in the tens weight entry times 15 shillings). Then, the five in the hundredths place in the shillings computed value (15 shillings times 11.11 pounds equals 166.65 shillings) is multiplied by 12, and then the six in the tenths place in the shillings computed value is multiplied by 12. Sixty pulses are fed to 0.0X pennies counter 266 (five in the hundredths place in the shillings computed value times 12) and seventy-two pulses are fed to 0.X pennies counter 267 (six in the tenths place in the shillings computed value times 12). Then, the 11 pennies are multiplied by 11.11 pounds in the same manner as the 15 shillings were multiplied by 11.11 pounds. Eleven pulses are fed to 0.0X pennies counter 266, eleven pulses are fed to 0.X pennies counter 267, eleven pulses are fed to X.0 pennies counter 268, and one hundred and ten additional pulses are fed to X.0 pennies counter 268.

In our example wherein 15 shillings and 11 pennies times 11.11 pounds equals 8 pounds, 16 shillings and 10 pennies, the partial products are entered and will accumulate in the counters to 8 pounds, 16 shillings and 10 pennies as shown in the following table:

15 pulses into 235 transfers 1 to 236 (5 left in 235)
15 pulses into 236 transfers 1 to 264 (6 left in 236)
15 pulses into 264—no transfer (16 left in 264)
150 pulses into 264 transfers 8 (*pounds*) to 265 (6 left in 264).
60 pulses into 266 transfers 6 to 267 (0 left in 266)
72 pulses into 267 transfers 7 to 268 (8 left in 267)
11 pulses into 266 transfers 1 to 267 (1 left in 266—dropped)
11 pulses into 267 transfers 2 to 268 (9 left in 268, 0 left in 267—dropped)
11 pulses into 268 transfers 1 to 264 ( 7 left in 264, 8 left in 268)
110 pulses into 268 transfers 9 to 264 (16 *shillings*) left in 264, 10 (*pence*) left in 268)

It is to be understood that the above description is illustrative of this invention and that various modifications thereof can be utilized without departing from its spirit and scope.

Having described the invention, I claim:

1. In a system having a cycle of operations for weighing, computing and printing a record of the value in the sterling system of each of a plurality of successively weighed loads, in combination, weighing mechanism, computer means for computing the value of each weighed load according to a selected price in shillings and pennies, means for making weight information provided by the weighing mechanism available to the computer means, readout means electrically connected to the computer means including printer means for printing a record of the computed value, and programmer means for programming the system, the computer means including means for selecting places in the weight information and shillings and pennies in the price to be multiplied to form partial products and register means for accumulating the partial products as the computed value, the computer means also including means for converting any fractional part of the shillings portion of the computed value to pennies by entering said fractional part as though it were said weight information and multiplying it by twelve and the register means including a units pennies counting stage which counts by twelve, a units shilling counting stage which counts by twenty connected to the output of the units pennies counting stage and a pounds counting stage connected to the output of the units shilling counting stage, whereby a remainder less than a shilling remains in the units pennies counting stage and a remainder less than a pound remains in the units shilling counting stage after said partial products are accumulated.

2. In a system having a cycle of operations for weighing, computing and printing a record of the value in the sterling system of each of a plurality of successively weighed loads, in combination, weighing mechanism, computer means for computing the value of each weighed load according to a selected price in shillings and pennies, means for making weight information provided by the weighing mechanism available to the computer means, readout means electrically connected to the computer means including printer means for printing a record of the computed value, and programmer means for programming the system, the computer means including selecting means for selecting the shillings and pennies in the price to be multiplied by each place in the weight information and a series of counter stages controlled by the selecting means that by partial products accumulation produces the computed value in whole numbers of pounds, shillings and pennies, the counter stages including a units pennies counting stage which counts by twelve, a units shilling counting stage which counts by twenty connected to the output of the units pennies counting stage and a pounds counting stage connected to the output of the units shilling counting stage, whereby a remainder less than a shilling remains in the units pennies counting stage and a remainder less than a pound remains in the units shilling counting stage after said partial products are accumulated.

3. In a system having a cycle of operations for weighing, computing and printing a record of the value in the sterling system of each of a plurality of successively weighed loads, in combination, weighing mechanism, computer means for computing the value of each weighed load according to a selected price in shillings and pennies, means for making weight information provided by the weighing mechanism available to the computer means, readout means electrically connected to the computer means including printer means for printing a record of the computed value, and programmer means for programming the system, the computer means including means for selecting the shillings and pennies in the price and places in the weight information to be multiplied as partial products, and register means having a plurality of sections so selected by the selecting means to receive the partial products that the computed value is accumulated, the computer means and the register means including further means for converting fractional shillings in the computed value to pennies by entering said fractional shillings as though it were said weight information and multiplying it by twelve.

4. A computer comprising, in combination, first and second factor entering means for entering a figure in shillings and pennies as a first factor and for entering a second factor having four places, selecting means for selecting the shillings and pennies portions of the first factor and the four places in the second factor to be multiplied as partial products, means for producing pulses corresponding in number to the partial products obtained by multiplying the three least significant places in the second factor and for producing pulses corresponding ten times in number to the partial products obtained by multiplying the most significant place in the second factor, and register means having a plurality of sections for receiving the pulses and so selected by the selecting means to receive the pulses that partial products obtained by multiplying the two most significant places in the second factor are accumulated in common sections and so selected that a computed value is accumulated.

5. In a system for weighing and computing the value in the sterling system of each of a plurality of successively weighed loads, a computer comprising means for multiplying shillings in a price entry by four weight places, pennies in the price entry by said four weight places, and a factor of twelve by two places in any fractional shilling portion of the computed value to obtain partial products as pulses, and means having pennies, shillings and pounds counting sections for so accumulating the pulses as whole numbers of pounds, shillings and pennies that a remainder less than a shilling remains in the pennies counting section and a remainder less than a pound remains in the shillings counting section after said pulse accumulating is finished.

References Cited by the Examiner

UNITED STATES PATENTS

| | | | |
|---|---|---|---|
| 2,963,222 | 12/1960 | Allen | 235—151.33 |
| 3,067,938 | 12/1962 | Springer | 235—156 |
| 3,084,285 | 4/1963 | Bell et al. | 235—151.33 X |
| 3,205,956 | 9/1965 | Bell et al. | 235—151.33 X |

MALCOLM A. MORRISON, *Primary Examiner.*

M. J. SPIVAK, *Assistant Examiner.*